United States Patent [19]
Lee

[11] Patent Number: 5,975,063
[45] Date of Patent: Nov. 2, 1999

[54] MISFIRE PREVENTION SYSTEM DURING EVAPORATED GAS MONITORING AND CONTROL METHOD THEREOF

[75] Inventor: Sae-Yong Lee, Seoul, Rep. of Korea

[73] Assignee: Hyundai Motor Company, Ltd., Seoul, Rep. of Korea

[21] Appl. No.: 08/774,222

[22] Filed: Dec. 27, 1996

[30] Foreign Application Priority Data

Dec. 29, 1995 [KR] Rep. of Korea ............. 95-66782

[51] Int. Cl.$^6$ ............................................ F02M 33/04
[52] U.S. Cl. ............................................ 123/520; 123/698
[58] Field of Search ............................ 123/516, 518, 123/519, 520, 689, 698

[56] References Cited

U.S. PATENT DOCUMENTS

| | | |
|---|---|---|
| 5,273,018 | 12/1993 | Suzuki . |
| 5,398,661 | 3/1995 | Denz et al. ............... 123/520 |
| 5,474,049 | 12/1995 | Nagaishi et al. .......... 123/698 |
| 5,499,617 | 3/1996 | Kitjima et al. ............ 123/698 |
| 5,533,493 | 7/1996 | Atanasyan ................ 123/698 |
| 5,535,719 | 7/1996 | Morikawa et al. ......... 123/698 |
| 5,559,706 | 9/1996 | Fujita ..................... 123/520 |
| 5,562,757 | 10/1996 | Brun et al. ............... 123/520 |
| 5,685,285 | 11/1997 | Ohtani et al. ............ 123/698 |

*Primary Examiner*—Thomas N. Moulis
*Attorney, Agent, or Firm*—Birch, Stewart, Kolasch & Birch, LLP

[57] ABSTRACT

The present invention relates to a misfire prevention system during evaporated gas monitoring and control method thereof by which an increased overall fuel quantity caused by the purge gas is considered and compensated thereto accordingly, so that occurrence of misfire resulted from changes of fuel-air ratio can be prevented. The system includes a fuel tank for storing fuel of a vehicle; a canister for temporarily collecting evaporated gas which is generated when the fuel stored in the fuel tank is evaporated; an engine for drawing up the evaporated gas collected in the canister by way of negative pressure and for burning the same with basic fuel to thereby operate a vehicle; a purge control valve being mounted between the engine and the canister to control pressure in the fuel tank; a shut-off valve being mounted at a discharge outlet of the canister to control the pressure in the fuel tank; a pressure sensor for detecting the pressure in the fuel tank; and an electronic control unit (ECU) for controlling operations of the purge control valve and the shut-off valve and for detecting leakage of the evaporated gas according to the pressure in the fuel tank detected by the pressure sensor and for compensating an increase of fuel quantity caused by purge gas during a racing to thereby maintain a fuel-air ratio at a constant level.

10 Claims, 2 Drawing Sheets

MISFIRE PREVENTION SYSTEM DURING EVAPORATED GAS MONITORING AND CONTROL METHOD THEREOF

BACKGROUND OF THE INVENTION

1. Field of the Invention

The present invention relates to a misfire prevention system during an evaporated gas monitoring and a control method thereof, and more particularly to a misfire prevention system during an evaporated gas monitoring process and a control method thereof. An evaporated gas leakage is monitored and at the same time, the leakage is compensated in consideration of a total fuel quantity increase according to generation of the evaporated gas, thereby preventing misfire caused by a change of an air-fuel ratio.

2. Description of the Prior Art

An environmental law has been recently enacted to enforce the regulation of evaporated gas directly emitted into the atmosphere from fuel supply systems of vehicles.

In other words, where a problem involving a purge control system exists, an accurate monitoring function is necessary for the system because of significant leakage of evaporated gas.

The environmental law concerning evaporated gas control calls for a detection of leakage (diameter of 1 mm) at a purge control system to activate a warning light in case of the leakage.

The accurate monitoring on the relevant system is generally performed by checking pressure at a time when a fuel supply system is near empty.

Furthermore, monitoring is executed while an engine races and the vehicle is stopped in operation.

At an initial stage of the monitoring, when a purge control valve (pressure control solenoid valve) is opened and a shut-off valve mounted at a discharge outlet of a canister (which temporarily collects the evaporated gas) is closed, a fuel tank is evacuated at an interior thereof by negative pressure of the engine.

At this time, when the evacuated state is not detected by a pressure sensor for detecting pressure in the fuel tank, it is determined that a big leakage of evaporated gas has occurred in the purge control system.

Likewise, a small leakage of the evaporated gas can be detected by a vacuum pressure decrease rate measured at a time when the tank is airtightly shut, where the purge control valve is shut at a predetermined pressure.

The leakage is currently checked by measurement of pressure inclination changes generated by causing a fuel supply system to be evacuated.

However, there is a problem in the monitoring process of the evaporated gas leakage thus described, in that the air-fuel ratio can be changed abruptly so that a misfire could occasionally occur because the purged gas, that is the evaporated gas infused into a surge tank during the operation of the purge control valve, is not considered in the calculation of the basic fuel amount.

In order to overcome the aforementioned problem, the shut-off valve is closed at an initial stage while the engine races and the purge control valve is opened at a predetermined inclination to thereby cause the fuel supply system to be evacuated.

At this time, if an evaporated fuel concentration collected in a canister is large, the gas is infused into the surge tank by the operation of the purge control valve to thereby form a rich mixture, resulting in a severe change of the air-fuel ratio. This also causes a misfire and a decrease in stable racing.

FIG. 1 is a waveform diagram for illustrating a change in an air-fuel ratio during operation of a purge control valve according to the prior art.

As illustrated in FIG. 1, an overall fuel quantity consumed in the engine is increased by the purge gas infused into the surge tank during an operation range of a purge control valve according to the prior art, thereby varying the air-fuel ratio.

SUMMARY OF THE INVENTION

Accordingly, the present invention is provided to solve the aforementioned problems and it is an object of the present invention to provide a misfire prevention system during evaporated gas monitoring and a control method thereof by which leakage of the evaporated gas is monitored. Simultaneously, an increase of the overall fuel quantity caused by the purge gas is considered and compensated thereto accordingly, so that occurrence of misfire resulted from changes of the air-fuel ratio can be prevented.

In accordance with one aspect of the present invention, there is provided a misfire prevention system during evaporated gas monitoring, the system comprising:

a fuel tank for storing fuel of a vehicle;

a canister for temporarily collecting evaporated gas which is generated when the fuel stored in the fuel tank is evaporated;

an engine for drawing up the evaporated gas collected in the canister by way of negative pressure and for burning the same with the fuel to thereby operate the vehicle;

a purge control valve being mounted between the engine and the canister to thereby control pressure in the fuel tank;

a shut-off valve being mounted at a discharge outlet of the canister to thereby control the pressure in the fuel tank;

a pressure sensor for detecting the pressure in the fuel tank; and an electronic control unit (ECU) for controlling operations of the purge control valve and the shut-off valve and for detecting leakage of the evaporated gas according to the pressure in the fuel tank detected by the pressure sensor and for compensating the increase of fuel quantity caused by gas purged during the racing of the engine to thereby maintain an air-fuel ratio at a constant level.

In accordance with another aspect of the present invention, there is provided a misfire prevention control method, the method comprising the steps of:

measuring a variation rate of the air-fuel ratio during an operation of a pressure control solenoid valve to thereby determine a fuel rich strength index;

dividing a maximum purge gas volume during the racing of an engine by an air volume of a fuel storing means to thereby calculate a maximum purge gas volume in volume units; and obtaining a fuel quantity increased by the purge gas volume according to the fuel rich strength index and the purge gas volume in volume units to thereby compensate for the fuel quantity increased in the basic fuel quantity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

The preferred embodiment of the present invention will be described in detailed with reference to the accompanying drawings.

Figure 1:
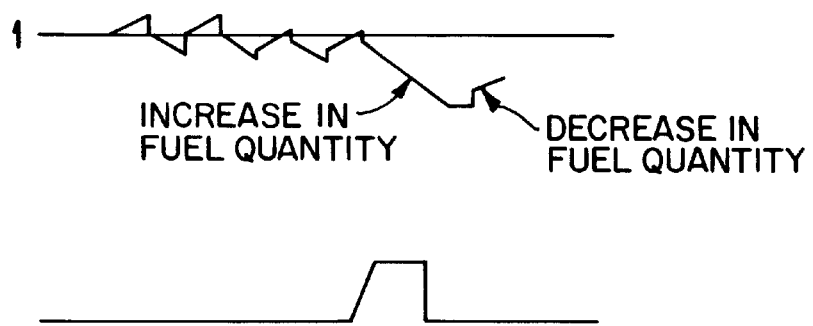
FIG. 1 is a waveform diagram for illustrating changes of the air-fuel ratio during operation of a purge control valve according to the prior art.
Figure 2:
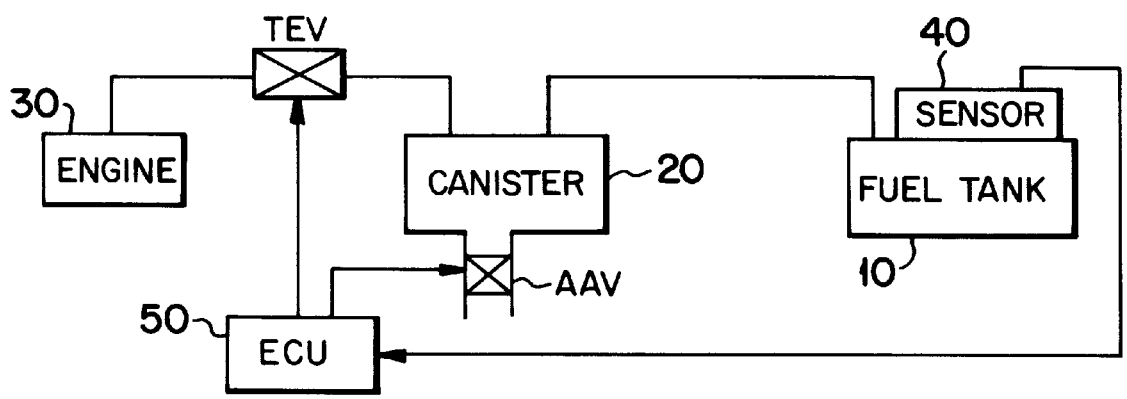
FIG. 2 is a block diagram for illustrating a misfire prevention system during evaporated gas monitoring process according to an embodiment of the present invention.

FIG. 2 is a block diagram for illustrating a misfire preventing system during the evaporated gas monitoring process according to the embodiment of the present invention.

As illustrated in FIG. 2, the misfire prevention system which is operated during the evaporated gas monitoring process according to the present invention comprises:

a fuel tank 10 for storing fuel of a vehicle;

a canister 20 for temporarily collecting evaporated gas which is generated when the fuel stored in the fuel tank is evaporated;

an engine 30 for drawing up the evaporated gas collected in the canister 20 by way of negative pressure and for burning the same with the fuel to thereby operate a vehicle;

a pressure control solenoid valve (TEV) being mounted between the engine 30 and the canister 20 to thereby control the pressure in the fuel tank 10;

a shut-off valve (AAV) being mounted at a discharge outlet of the canister 20 to thereby control the pressure in the fuel tank 10;

a pressure sensor 40 for detecting the pressure in the fuel tank 10; and an electronic control unit (ECU) 50 for controlling operations of the pressure control solenoid valve (TEV) and the shut-off valve (AAV) and for detecting leakage of the evaporated gas according to the pressure in the fuel tank 10 detected by the pressure sensor 40 and for compensating an increase of fuel quantity caused by gas purged during the racing of the engine to thereby maintain a air-fuel ratio at a constant level.

Now, operation of the misfire prevention system during the evaporated gas monitored process according to the embodiment of the present invention thus constructed will be described.

The misfire prevention system which is operated during evaporated gas monitoring is provided to monitor leakage of the evaporated gas and simultaneously to consider an increase of overall fuel quantity caused by the gas purged and to compensate accordingly, so that occurrence of a misfire resulting from a change of the air-fuel ratio can be prevented.

The misfire prevention system operates when the evaporated gas is monitored according to the embodiment of the present invention and prevents changes of the air-fuel ratio according to the following control method.

A variation rate of the fuel-air ratio is calculated to determine the fuel rich strength index (frs).

Figure 3:
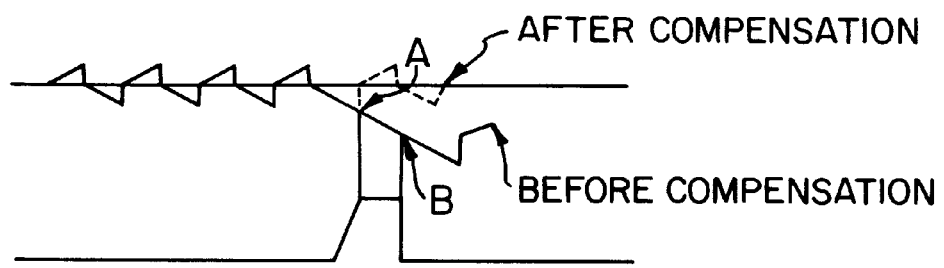
FIG. 3 is a waveform diagram for illustrating a measurement time of the air-fuel ratio variation rate during operation of a pressure control solenoid valve before and after compensation of the fuel quantity which is increased by the purge.

FIG. 3 is a waveform diagram for illustrating a measurement time of an air-fuel ratio variation rate FR during operation of a pressure control solenoid valve and an air-fuel ratio before and after compensation for the fuel quantity which is increased by the purge.

As illustrated in FIG. 3, the measurement time of the air-fuel ratio variation rate FR defines a period from a certain time (A) to a time (B) when the pressure control solenoid valve (TEV) is closed during operation.

A difference of an air-fuel ratio (air-fuel variation rate FR) at respective times is calculated and then, an average value of the air-fuel ratio is deducted by the air-fuel ratio variation rate (1−FR), which is then multiplied by a proportional constant (K) to thereby determine the fuel rich strength index (frs).

There are two ways of establishing the proportional constant (K).

Method 1:

As per Table 1, the proportional constant (K) is established by an atmospheric temperature function map.

TABLE 1

| atmospheric temperature (° C.) | −10 | 0 | 20 | 40 |
|---|---|---|---|---|
| K | | 0 | 1 | 2 | 3.5 |

Method 2:

"1−FR" is integrated by an integrator instead of the proportional constant.

After the variation rate of the air-fuel ratio is calculated to thereby determine the fuel rich strength index (frs), a ratio between a maximum purge volume and the air volume during the racing of the engine is determined.

The purge quantity during the racing of the engine is a function of the operation of the pressure control solenoid valve (TEV), so that the maximum purge quantity during the racing of the engine is obtained from the operation of the pressure control solenoid valve (TEV), which is then divided by a measured air volume (ml) during the racing of the engine to thereby obtain a purge quantity (frt) in volume units.

A value representing fuel quantity (FT) increased by the purge is obtained according to the fuel rich strength index (frs) and the purge volume (frt) in volume units. A compensation value is determined to account for the fuel quantity increased in the basic fuel quantity due to the purge.

The fuel quantity (FT) increased by the purge is obtained by multiplying the fuel rich strength index (frs) with the purge volume (frt) in volume units. From the FT value, an average air-fuel ratio (fte) is determined.

Next, the basic fuel quantity is multiplied by the value (fte) to thereby compensate for the increased fuel quantity.

Figure 4:
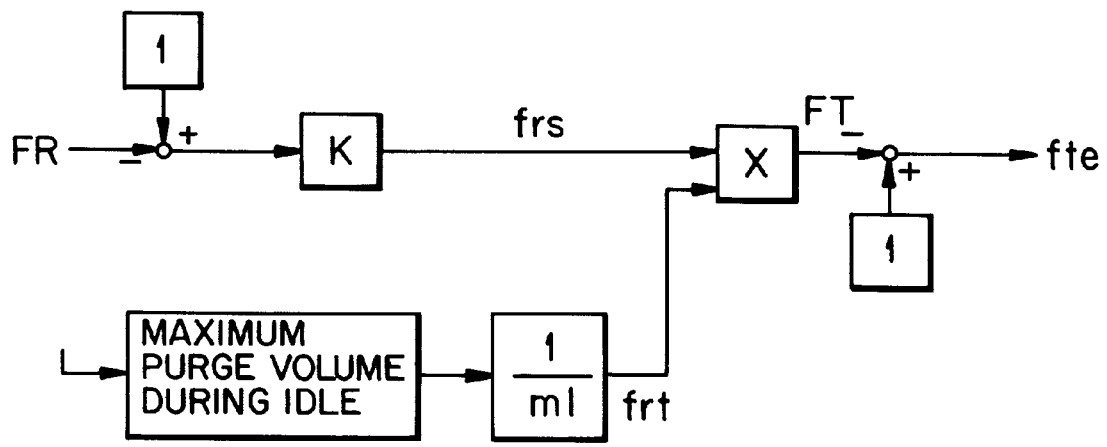
FIG. 4 is a block diagram for illustrating a control method of misfire prevention system during the evaporated gas monitoring process according to the embodiment of the present invention.

FIG. 4 shows a block diagram for illustrating a control method of misfire prevention system during the evaporated gas monitoring process according to the embodiment of the present invention, where the above process is illustrated.

Accordingly, there is an advantage in the misfire prevention system during evaporated gas monitoring process and a control method thereof according to the present invention thus operated. An increased overall fuel quantity caused by the purge gas is considered and compensated accordingly, so that occurrence of misfire resulted from changes of fuel-air ratio can be prevented.

The invention being thus described, it will be obvious that the same may be varied in many ways. Such variations are not to be regarded as a departure from the spirit of scope of the invention, and all such modifications as would be obvious to one skilled in the art are intended to be included within the scope of the following claims.

I claim:

1. A misfire prevention system comprising:
   an engine;
   means for storing fuel of said engine;
   means for temporarily collecting evaporated gas which is generated when fuel stored in said storing means is evaporated, said temporarily collecting means including a canister, said engine drawing up the evaporated gas collected in said temporarily collecting means by negative pressure and for burning said evaporated gas with said fuel;
   first valve means for controlling pressure in said fuel storing means, said first valve means being mounted between said engine means and said temporarily collecting means;
   second valve means for controlling pressure in fuel storing means, said second valve means being mounted at a discharge outlet of said temporarily collecting means;
   pressure sensing means for detecting pressure in said fuel storing means; and
   means for electronically controlling operations of said first and second valve means, said electronic control means detecting leakage of said evaporated gas according to said pressure sensing means, said electronic control means calculating a volume of gas purged from said temporarily collecting means according to operation of said first valve means, said electronic control means compensating for an increase of fuel quantity to maintain an air-fuel ratio at a constant level to prevent misfiring of said engine.

2. The misfire prevention system of claim 1, wherein said means for storing fuel is a fuel tank of an automobile.

3. The misfire prevention system of claim 1, wherein said first valve means is a purge control solenoid valve connected to said canister and said engine.

4. The misfire prevention system of claim 3, wherein said second valve means is a shut-off valve mounted at said discharge outlet of said canister.

5. A misfire prevention control method comprising:
   measuring variations of an air-fuel ratio during operation of a valve means for controlling pressure;
   determining a fuel rich strength index from the variations of said air-fuel ratio;
   calculating a maximum purge gas volume according to operation of said valve means:
   dividing said maximum purge gas volume during racing of an engine by an air volume of a fuel storing means to calculate the maximum purge gas volume in volume units;
   determining an increase in a fuel quantity due to the purge gas volume by the fuel rich strength index and the purge gas volume in volume units; and
   maintaining an air-fuel ratio at a constant level according to the increase in the fuel quantity determined to thereby prevent engine misfiring.

6. The misfire prevention control method according to claim 5, wherein the fuel rich strength index is determined by the equation, $$frs = (1-FR) \cdot k$$

where the variable frs defines the fuel rich strength index, the variable FR defines the variations of the air-fuel ratio, and k defines a proportional constant.

7. The misfire prevention control method according to claim 5, wherein the fuel rich strength index is determined by the equation, $$frs = \int (1-FR)$$

where the variable frs defines the fuel rich strength index, and the variable FR defines the variations of the air-fuel ratio.

8. The misfire prevention control method according to claim 6, wherein said proportional constant k is defined by an atmospheric temperature function map comprising

| atmospheric temperature (° C.) | −10 | 0 | 20 | 40 |
|---|---|---|---|---|
| k | 0 | 1 | 2 | 3.5 | where k is dependent on atmospheric temperature.

9. The misfire prevention control method according to claim 6, further comprising the steps of:
   calculating a calculating an average air-fuel ratio fte where:

$$fte = 1-FT$$

FT=frs·(maximum purge gas volume/air volume of said fuel storing means) where the variable FT defines the increase in the fuel quantity due to the purge gas volume, and
   calculating a compensation value c where:

$$c = (\text{basic fuel quantity}) \cdot fte.$$

10. The misfire prevention control method according to claim 8, further comprising the steps of:
    calculating a calculating an average air-fuel ratio fte where:

$$fte = 1-FT$$

FT=frs·(maximum purge gas volume/air volume of said fuel storing means) where the variable FT defines the increase in the fuel quantity due to the purge gas volume, and
    calculating a compensation value c where:

$$c = bfq \cdot fte$$

where the variable bfq defines a basic fuel quantity.

* * * * *